United States Patent
Maderud et al.

(10) Patent No.: US 12,383,956 B2
(45) Date of Patent: Aug. 12, 2025

(54) METHOD OF MAKING CERMET OR CEMENTED CARBIDE POWDER

(71) Applicant: SANDVIK INTELLECTUAL PROPERTY AB, Sandviken (SE)

(72) Inventors: Carl-Johan Maderud, Stockholm (SE); Johan Sundstrom, Lovstabruk (SE); Magnus Ekelund, Jarna (SE); Sven Englund, Linkoping (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 17/830,401

(22) Filed: Jun. 2, 2022

(65) Prior Publication Data
US 2022/0288683 A1 Sep. 15, 2022

Related U.S. Application Data

(60) Continuation of application No. 16/985,508, filed on Aug. 5, 2020, now abandoned, which is a division of
(Continued)

(30) Foreign Application Priority Data
Apr. 24, 2014 (EP) ..................................... 14165842

(51) Int. Cl.
*B22F 3/15* (2006.01)
*B22F 1/052* (2022.01)
(Continued)

(52) U.S. Cl.
CPC ................ *B22F 3/15* (2013.01); *B22F 1/065* (2022.01); *B22F 1/142* (2022.01); *B22F 3/1003* (2013.01);
(Continued)

(58) Field of Classification Search
CPC .......... B22F 3/15; B22F 3/1003; C22C 1/051; C22C 1/058
See application file for complete search history.

(56) References Cited

U.S. PATENT DOCUMENTS 4,608,318 A * 8/1986 Makrides .................. B22F 7/08
428/614
5,051,232 A * 9/1991 Summers ................ B22F 5/003
419/38
(Continued)

FOREIGN PATENT DOCUMENTS

DE 4134144 A1 * 6/1993 ................ B22F 1/02
DE 102013004182 A1 * 9/2014 ............ B22F 1/0059
(Continued)

OTHER PUBLICATIONS

JP 2001303106 A, English machine translation (Year: 2001).*
(Continued)

*Primary Examiner* — Keith Walker
*Assistant Examiner* — Catherine P Smith
(74) *Attorney, Agent, or Firm* — Corinne R. Gorski

(57) ABSTRACT

The present disclosure relates to a method of making a powder of dense and spherically shaped cemented carbide or cermet granules. The present disclosure also relates to a powder produced by the method and use of said powder in additive manufacturing such as 3D printing by the binder jetting technique. Furthermore, the present disclosure relates to a Hot Isostatic Pressing (HIP) process for manufacturing a product by using said powder.

18 Claims, 1 Drawing Sheet

Related U.S. Application Data application No. 15/305,760, filed as application No. PCT/EP2015/058790 on Apr. 23, 2015, now abandoned.

(51) Int. Cl.

| | |
|---|---|
| *B22F 1/065* | (2022.01) |
| *B22F 1/142* | (2022.01) |
| *B22F 3/10* | (2006.01) |
| *B22F 3/12* | (2006.01) |
| *B22F 7/06* | (2006.01) |
| *B22F 9/04* | (2006.01) |
| *B22F 10/14* | (2021.01) |
| *B22F 10/34* | (2021.01) |
| *B28B 3/00* | (2006.01) |
| *B33Y 10/00* | (2015.01) |
| *B33Y 40/00* | (2020.01) |
| *B33Y 40/10* | (2020.01) |
| *B33Y 70/00* | (2020.01) |
| *B33Y 70/10* | (2020.01) |
| *C22C 29/02* | (2006.01) |
| *C22C 29/08* | (2006.01) |
| *C22C 29/10* | (2006.01) |
| *C22C 29/16* | (2006.01) |

(52) U.S. Cl.
CPC .......... *B22F 3/1021* (2013.01); *B22F 3/1216* (2013.01); *B22F 7/06* (2013.01); *B22F 9/04* (2013.01); *B22F 10/34* (2021.01); *B28B 3/003* (2013.01); *B33Y 10/00* (2014.12); *B33Y 40/00* (2014.12); *B33Y 40/10* (2020.01); *B33Y 70/10* (2020.01); *C22C 29/02* (2013.01); *C22C 29/08* (2013.01); *C22C 29/10* (2013.01); *C22C 29/16* (2013.01); *B22F 1/052* (2022.01); *B22F 10/14* (2021.01); *B22F 2301/15* (2013.01); *B22F 2302/10* (2013.01); *B22F 2998/10* (2013.01); *B22F 2999/00* (2013.01); *B33Y 70/00* (2014.12); *Y02P 10/25* (2015.11)

(56) References Cited

U.S. PATENT DOCUMENTS

| | | | | |
|---|---|---|---|---|
| 5,102,452 | A * | 4/1992 | Taskinen | C22C 29/08 75/346 |
| 2002/0009411 | A1* | 1/2002 | Zucker | B82Y 30/00 423/440 |
| 2003/0000339 | A1* | 1/2003 | Findeisen | C22C 29/08 75/240 |
| 2014/0072821 | A1* | 3/2014 | Lee | C23C 4/067 428/552 |
| 2016/0380175 | A1* | 12/2016 | Miner | H10N 10/853 438/54 |

FOREIGN PATENT DOCUMENTS

| | | | |
|---|---|---|---|
| JP | 11322443 A | * | 11/1999 |
| JP | 2001303106 A | * | 10/2001 |

OTHER PUBLICATIONS

JP H11322443 A, English machine translation (Year: 1999).*
Ishida, K., Nishizawa, T. The C-Co(Carbon-Cobalt) system. JPE 12, 417-424 (1991). https://doi.org/10.1007/BF02645959 (Year: 1991).*
DE 102013004182 A1 Machine English Translation (Year: 2014).*
DE 4134144 A1 Machine English Translation (Year: 1993).*

* cited by examiner

METHOD OF MAKING CERMET OR CEMENTED CARBIDE POWDER

RELATED APPLICATION DATA

This application is a continuation of U.S. patent application Ser. No. 16/985,508 filed Aug. 5, 2020, which is a divisional of U.S. patent application Ser. No. 15/305,760 filed Oct. 21, 2016, which is a § 371 National Stage Application of PCT International Application No. PCT/EP2015/058790 filed Apr. 23, 2015, claiming priority of EP Application No. 14165842.7, filed Apr. 24, 2014.

TECHNICAL FIELD

The present disclosure relates to a method of making a powder of dense and spherically shaped cemented carbide or cermet granules. The present disclosure also relates to a powder produced by the method and use of said powder in additive manufacturing such as 3D printing by the binder jetting technique.

Furthermore, the present disclosure relates to a Hot Isostatic Pressing (HIP) process for manufacturing a product by using said powder.

BACKGROUND

Additive manufacturing alias 3D (three dimensional) printing is a process of making three-dimensional solid components from a digital model using an additive process. In such a process layers of material are successively laid down and the component is built up layer by layer. 3D printing differs from traditional machining techniques in that it is a process building up the shape, whereas traditional machining typically relies on the removal of material from a work piece by methods such as cutting or drilling and thereby forming the final shape.

In an example of a binder jetting type of 3D printing process, a first layer of powder is spread over a surface. A liquid binder is deposited (printed) over the surface in a pattern predetermined by a digital model. A second layer of powder is spread out for the next predetermined pattern to be printed. This process is repeated until the forming of the 3D printed green body is completed. A subsequent curing process for improving the strength of certain thermosetting polymers might also be required. The 3D printed green body is after removal of loose (binder-less) powder ready for a subsequent debinding and sintering process. For example, components of cermet, cemented carbide or metal can be produced by the described procedure. The final density and quality of the sintered product depends on for example the sintering conditions and the powder properties. An example of making cermets with a 3D method from a powder is disclosed in "(Ti,W)C—Ni cermets by laser engineered net shaping" by Y. Xiong et al published in Powder Metallurgy 2010, vol 53, No. 1, page 41-46.

There is a continuous need of making it possible to produce high quality products of cermets or cemented carbide with 3D printing techniques. This implies high demands on the powder to be used in the process. Examples of features that are to be controlled in the final production of a component are the grain size, the porosity and the shape retention and shrinkage of the product. This implies high demands on the powder to be used since the quality and properties of the powder is essential for the quality of the final component.

SUMMARY

It is an aspect of the present disclosure to provide a method of making a powder that can be used in 3D printing for production of cermet or cemented carbide products. A further aspect is to provide a method of making a powder that overcomes at least some of the above mentioned demands A further aspect of the present disclosure is to present a HIP process using the powder as defined hereinabove or hereinafter which will provide cemented carbides or cermets with enhanced hardness and wear resistance.

One advantage with the method according to the present disclosure is that it is possible to convert powder of spherically shaped granules comprising agglomerated (porous) constituents of cermet or cemented carbide to a powder comprising dense and spherically shaped cermet or cemented carbide granules. The powder may be produced with less problems of granules sticking or sintering together (hereafter denoted "inter-granule sintering") since the inhibitor powder prevents contact between individual spherically shaped granules during the sintering densification. Inter-granule sintering typically causes the sintered powder to stick together and thereby co-sintered granule agglomerates or even a sintered cake of the powder is formed. A sintered powder cake could possibly be milled to form a powder again with a certain degree of breakage of granules, loss of the spherical shape of some granules and a decreased amount of the finest spherical granules.

Another advantage of the method as defined hereinabove or hereinafter is that the spherical shape from the granulated state as porous granules can be preserved during sintering and thus resulting in a powder comprising dense and spherically shaped cermet or cemented carbide granules. A spherical shape of the granules is advantageous as a powder of spherically shaped granules has good flow properties and good packing properties.

Further, another advantage of the method as defined hereinabove or hereinafter is that the produced powder of dense and spherically shaped cermet or cemented carbide granules exhibits a high or even full density in every granule and therefore the total volume of pores in a 3D printed body would be less than the total volume would be if using porous and less densely packed cermet or cemented carbide granules. Such aspects of density have large impact on the shrinkage and ability to conform to the predicted body geometry after a subsequent sintering or HIP process. It is to be noted that larger hollow space in a granule originating from a spray drying might still exist.

Further, yet another advantage of the method as defined hereinabove or hereinafter is that the produced powder in virtue of the dense and spherically shaped cermet or cemented carbide granules confers high packing density to the green body. This is advantageous due to limited shrinkage during a subsequent sintering treatment of the green body.

Furthermore, a high packing density promotes the achievement of a high sintered density, which can be decisive for the achievement of a closed porosity (i.e. not inter-connected porosity). Only by the obtained state of closed porosity, the body can be further densified to full density by a subsequent post-sintering HIP process.

A powder produced in accordance with the present disclosure can be used in powder metallurgy (PM) area for example for manufacturing of near net shaped cermet or cemented carbide components. The application area of the present disclosure is as powder feedstock for binder jetting 3D-printing techniques and also near net shape HIP of encapsulated powder. Alternatively, the powder can be used in other types of additive manufacturing techniques as well as other PM-techniques in general.

One advantage with the process as defined hereinabove or hereinafter is that the obtained component can be a fully dense net- or near net shaped component, thus the obtained component will almost have no voids or have no voids.

Another advantage with the process as defined hereinabove or hereinafter is that when zirconium alloy or titanium alloy is used as capsule material, a layer of ZrC or TiC is formed in the contact interface between the capsule and the cemented carbide or cermet. This carbide layer is dense and has almost no cracks and prevents therefore most of the interdiffusion between the capsule and the powder as defined hereinabove or hereinafter. Thus, this carbide layer thereby limits the loss of carbon from the cemented carbide or the cermet to the capsule material and maintains the chemical balance and stability of the cemented carbide or cermet. Furthermore, this carbide layer provides conditions to avoid formation of low carbon containing carbides such as e.g. M2C, M6C and M12C. Thus, different grades of the Zr (Zirconium) or Ti (Titanium) alloy may be used for capsule material. Also, pure Ti or pure Zr may be used as capsule material.

Other aspects, advantages and novel features of the disclosure will become apparent from the following detailed description of the disclosure when considered in conjunction with the accompanying drawings and claims.

DEFINITIONS

Figure 1:
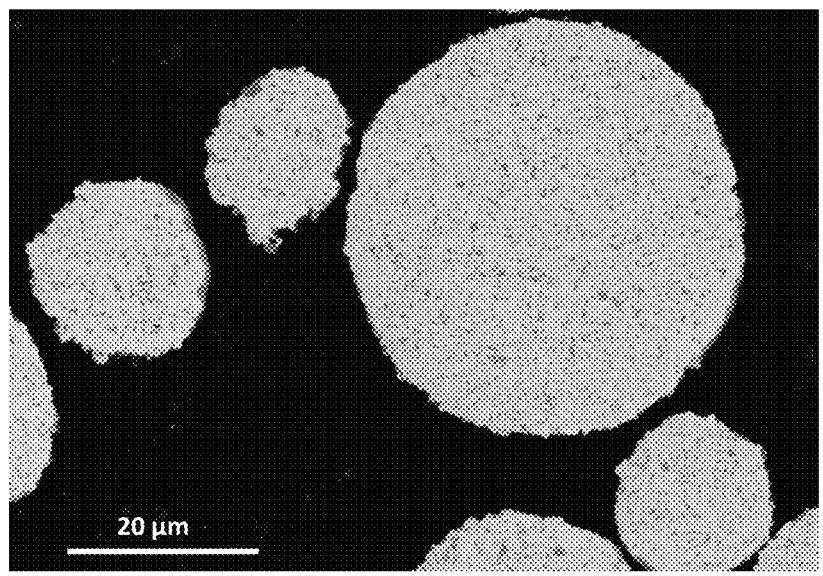
FIG. 1 shows a Scanning Electron Microscope (SEM) image at about 1500× magnification of dense cemented carbide granules made in accordance with Example 2.

The term "cermet" is herein intended to denote a material comprising a ceramic phase, i.e. hard constituents, and a metallic binder phase.

The term "cemented carbide" is herein intended to denote a material comprising a ceramic phase, i.e. hard constituents, and a metallic binder phase, where the ceramic phase comprises WC and the metallic phase comprises Co and optionally one or more of Ni, Fe, Cr and Mo.

The term "granule" refers to the agglomerated state of a mixture that is produced by e.g. spray drying.

The term "dense granule" refers to the sintered and densified granule.

The term "sintering" is a generic term for a process wherein heating under controlled atmosphere is conducted in order to minimize the surface of a particulate system, which mostly is associated with generation of bonds between neighboring particles or granules and shrinkage of the aggregated particles or granules.

The term "intra-granule sintering" refers to the sintering inside a granule causing the individual granules to densify and shrink and to form a dense and spherically shaped granule.

The term "inter-granule sintering" refers to the creation of sintering bonds between neighboring granules.

The term "green body" refers to a body comprising granules that are bonded by organic binder.

The term "solidus" refers to a certain temperature that when being exceeded leads to the inception of liquid phase formation.

The term "about" as used herein is intended to mean +/−10% of the numerical value.

DETAILED DESCRIPTION

The present disclosure relates to a method of making a powder of dense and spherically shaped cermet or cemented carbide granules, wherein the method comprises the steps of:

(a) forming spherically shaped granules comprising metal, hard constituents and organic binder;
(b) mixing said spherically shaped granules with a sintering inhibitor powder to form a mixture of spherically shaped granules and sintering inhibitor powder;
(c) loading the mixture of spherically shaped granules and sintering inhibitor powder in a furnace chamber;
(d) heat-treating the mixture obtained in step (b) in the furnace chamber at a sintering temperature to remove organic binder from the spherically shaped granules and to sinter the hard constituents with the metal in each spherically shaped granule and thereby forming an intermediate product of a mixture of sintered dense spherically shaped granules and sintering inhibitor powder;
(e) unloading the intermediate product of the mixture of sintered dense spherically shaped granules and sintering inhibitor powder from the furnace chamber; and
(f) separating the sintering inhibitor powder from the sintered dense spherically shaped granules whereby a powder of dense and spherically shaped cermet or cemented carbide granules is formed, wherein the sintering inhibitor powder comprises carbon.

The forming of spherically shaped granules of metal, hard constituents and organic binder may be performed by spray drying. The organic binder can, for example, be PEG (polyethylene glycol). The metal is typically Cobalt (Co) or a mixture of Co and one or more of Nickel (Ni), Iron (Fe), Chromium (Cr) and Molybdenium (Mo). The hard constituents may, for example, be WC, TiC, TiN, Ti(C,N) and/or NbC. The step of providing the granules with a spherical shape is important since the subsequent heating process will ideally make the granules to shrink but preserve their original spherical shape.

The step of mixing the spherically shaped granules with a sintering inhibitor powder to form a mixture of spherically shaped granules and sintering inhibitor powder may be performed in a conventional mixing equipment, but care should be taken not to deform the spherical shape of the granules or to unintentionally reduce the size of the spherically shaped granules.

The step of loading the mixture of spherically shaped granules and sintering inhibitor powder in a furnace chamber may typically be performed by placing said mixture in a tray or in a vessel that can be loaded in the furnace chamber.

The step of heat-treating the mixture of spherically shaped granules and sintering inhibitor in the furnace chamber at a sintering temperature is performed in order to remove the organic binder from the spherically shaped granules and to sinter the hard constituents with the metal in each spherically shaped granule and thereby form a mixture of sintered dense spherically shaped granules and sintering inhibitor powder. At an initial stage of the sintering, typically even before the sintering temperature has been reached, the organic binder will evaporate and will leave the spherically shaped granules by degassing. At the sintering temperature, the metal and the hard constituents will sinter and form dense spherically shaped granules.

The step of unloading the mixture of sintered dense spherically shaped granules and sintering inhibitor powder from the furnace chamber may be performed after a cooling step wherein the mixture of sintered dense spherically shaped granules and sintering inhibitor powder has reached a temperature of about room temperature.

The step of separating the sintering inhibitor powder from the sintered spherically shaped dense granules may be performed in one or several subsequent steps using one or several techniques. The result from the separation is a powder of dense and spherically shaped cermet or cemented carbide granules and a separate inhibitor powder. The inhibitor powder may preferably be reused in a subsequent process following the method in accordance with the present disclosure.

The purpose of the inhibitor powder is to prevent the spherically shaped granules from building inter-granule bonds during sintering. Without any sintering inhibitor powder, strong inter-granule bonds will be formed during sintering at temperatures above the solidus temperature of the metal. Mechanical forces must then be applied (e.g. in a disintegrator mill) in order to break the inter-granule bonds. However, during such an operation, a certain fraction of the granules will most probably be cracked and fractured, whilst yet another fraction might not be separated into their individual granule entities. The latter case is mostly evident for the finest granules that are difficult to break apart from other fine granules or those bigger in size. Hence, the degree of sphericity will be decreased under these circumstances. The usage of inhibitor powder in the sintering heat-treatment will allow intra-granule sintering while avoiding the extent of inter-granule sintering. Thus, making it possible to produce cermet or cemented carbide granules that are both dense and spherical in a cost effective manner.

One advantage with the method in accordance with the present disclosure is that it is possible to produce a powder of dense and spherically shaped granules with a wide granule size distribution and/or with a considerable amount of small granules (<30 μm). Without the use of sintering inhibitor in accordance to the present disclosure, it becomes subsequently very difficult to separate these small dense granules from each other or from larger granules by milling or other methods. This leads to a decreased amount of fine dense granules in the powder. One important advantage with using sintering inhibitor powder is that the granules can be sintered at high temperatures (far exceeding the solidus temperature) without the disadvantage associated to such high temperatures when sintering without inhibitor powder. This freedom may be of importance, especially if the furnace is lacking the ability to control temperature in a precise manner throughout the furnace charge; but may also be of importance for the purpose of high throughput rate in the furnace. A high throughput rate means here as fast sintering cycle as possible, being equivalent with high heating loads that inevitably leads to high overheating in some parts of the batch relative others. Without the use of sintering inhibitor, the temperature control of the batch must be very precise, probably within +/−5° C., in order to adjust between the opposing goals of achieving high density granules versus avoiding too hard sintered cake.

The inhibitor powder has to be adapted in particle size and in amount to reach the advantageous effects as associated with the present disclosure. The average particle size of the inhibitor powder should preferably not be larger than the average spherically shaped granule size, since the mixing of the powders would then most probably not lead to full separation of the spherically shaped granules and thereby not fulfil the object of inter-granule sintering inhibition. The amount of inhibitor powder needed to separate the spherically shaped granules from each other during the sintering step demands an optimization to be performed by the person skilled in the art. The amount of inhibitor powder needs to be high enough to separate the spherically shaped granules but not more than necessary in order to maintain high throughput through the furnace.

The porosity inside each dense cermet or cemented carbide spherically shaped granule is less than 5 vol %, such as <1 vol %, such as <0.5 vol %. A low porosity is advantageous in applications benefitted by high green body densities and for which the obtainment of a high green density depends upon solid incompressible granules' ability to redistribute into a dense packing arrangement (e.g. gauged by TAP density). In such applications, the internal porosity of the spherically shaped granules adds to the porosity between the granules to make up the overall porosity and thereby shrinkage of the finally produced dense body. 3D printing by binder jetting and HIP constitute examples of such applications.

The size of the sintered dense spherically shaped granules in the cermet or cemented carbide powder is distributed between 1-500 μm, more typically between 5-200 μm. Alternatively, the sintered dense spherically shaped granules are <50 μm, such as <30 μm. When using this powder for 3D printing of green bodies aimed to become subsequently sintered to almost full density or at least closed porosity, the spherically shaped granule size is preferably below 50 μm, such as below 30 μm. But even more important for such an application, the granule size fraction below 10 μm constitutes more than 10 wt % or more preferably 20 wt % of the complete distribution. In HIP applications the preferred continuous particle size distribution of the spherically shaped granules size is in the range of from about 5 to about 500 μm, such as about 10 to about 200 μm.

A narrow granule size distribution may be advantageous in virtue of less segregation problems, e.g. during handling, storage and transferring of the powder. A wide granule size distribution can be advantageous in applications relying on high green strength and high green density; e.g. in HIP when a capsule is being filled with powder having a wide distribution will obtain a higher packing density compared to a more narrowly distributed granule size. On the other hand, if the free flowing properties are of prime interest for the given application a narrow distribution can be preferred.

The heat treatment in the furnace chamber can be performed at a sintering temperature above the solidus temperature of the metal in the spherically shaped granules. When the sintering temperature is above the solidus temperature, liquid phase is formed. During cooling, when the metal cools down to solid phase again, the spherically shaped granules, as prevented from contact by the inhibitor powder, will form the dense and spherically shaped granules separated by inhibitor powder.

The heat treatment in the furnace chamber can be performed at a sintering temperature ranging of about 30° C. to about 100° C., or from 30° C. to 100° C., above the solidus temperature of the metal in the spherically shaped granules.

Alternatively the sintering is performed at a sintering temperature of more than about 100° C., or from 100° C., above the solidus temperature.

The inhibitor powder can be an oxide, preferably yttrium oxide. Yttrium oxide is an oxide that can withstand sintering at a temperature of more than 1000° C. without chemically reacting with the granules.

The inhibitor powder can also be carbon, such as graphite. When using carbon the subsequent steps of separating the sintered dense spherically shaped granules from the inhibitor powder, carbon as an inhibitor can be removed by thermochemical methods besides physical separation, e.g. air classification or sieving. Also with carbon, sintering of, for example cemented carbide granules, tends to deplete carbon, and with carbon as the inhibitor this will be compensated for. Also, carbon does not bring any contamination to the sintered dense spherically shaped granules since carbon already is part of the overall chemistry of cermets and cemented carbides.

In a sintering process, the solidus temperature of the metallic phase is important. Proximity of carbon to the metal typically influences the solidus temperature of the metal since the carbon partly dissolves into the metal. This can be analyzed in detail by studying phase diagrams having carbon for the relevant metallic phase. The solidus temperature decreases by dissolution of carbon, at least until full saturation is achieved. The optimum sintering temperature can be chosen based on this influence of solidus temperature exerted by carbon. In fact, it provides an exact measure of the solidus temperature since the saturation with respect to carbon is a rule that can be applied in general.

The inhibitor powder can be separated from the sintered dense spherically shaped granules by means of physical methods such as sieving, air classification, hydrocyclone, flotation and/or fluidization.

The inhibitor powder including carbon can be separated from the sintered dense spherically shaped granules by means of thermochemical methods using a gas at elevated temperature, preferably using a gas comprising hydrogen.

The thermochemical method can be performed in a continuous belt furnace loaded with fixed powder beds, a rotating tube furnace or in a fluidized bed furnace.

The present disclosure also relates to a powder of cermet or cemented carbide made in accordance with the disclosed method.

The present disclosure also relates to the use of a powder made in accordance with the disclosed method in 3D printing, preferably 3D printing of green body aimed for sintering to closed porosity. Closed porosity is considered to be porosity where the majority of the pores are closed by being surrounded by material, comparable to open pores which are open to the surroundings, i.e. not closed.

The present disclosure also relates to the use of a powder made in accordance with the disclosed method in HIP applications.

Furthermore, the present disclosure relates to a process for manufacturing a component comprising the following steps:
(a) providing a powder as defined hereinabove or hereinafter;
(b) providing a form;
(c) filling the form with the powder;
(d) evacuating air from the form;
(e) sealing the form;
(f) subjecting the at least one form to Hot Isostatic Pressing (HIP) at a predetermined temperature, a predetermined pressure and for a predetermined time so that the powder as defined hereinabove or hereinafter bond metallurgically wherein a solid body is formed, and wherein the form is made of an alloy of zirconium or an alloy of titanium.

According to the present process, in a first step the powder as defined hereinabove or hereinafter is provided. The powder may have a continuous particle size distribution in the range of from 1 to 500 µm, such as from 10 to 200 µm.

In a second step, a form is provided, wherein the form is sealable. More than one form may also be provided. Even though, the terms "form" and "capsule" are used herein interchangeably, the term "mould" could be used as well. The form is manufactured from an alloy of zirconium or an alloy of titanium and may be a manufactured of e.g. sheets or tubes, which are welded together. The form may have any shape. The form may also define a portion of the final component.

In the next step, the powder as defined hereinabove or hereinafter is poured/filled into the form, which form defines the shape of the component. The form is thereafter sealed, for example by welding. Prior to sealing the form, air is evacuated from the form. The air is removed (evacuated) as air typically contains argon, which has a negative effect on ductility. The evacuation is usually performed by using vacuum pump(s).

The filled, evacuated, and thereafter sealed form is then subjected to HIP in a heatable pressure chamber, normally referred to as a Hot Isostatic Pressing-chamber at a predetermined temperature, a predetermined isostatic pressure and a predetermined time so that said powder particles bond metallurgical to each other and so that the voids between the powder particles are closed and a solid and dense body is formed, thus a certain shrinkage of the total volume of said powder is obtained. Hence, the obtained component has a dense structure.

The heating chamber can be pressurized with gas, e.g. argon gas, to a predetermined pressure (isostatic pressure) of above 500 bar. Typically the isostatic pressure is from about 900 to about 1500 bar, such as of from 1000 to 1200 bar.

The heating chamber can be heated to a predetermined and suitable temperature allowing the powder particles to metallurgically bond and thereby allowing the voids in-between the powder particles to close, whereby a component having a dense structure is obtained. At low temperatures, the diffusion process slows down and the obtained component will contain residual porosity and the metallurgical bond between said powder particles becomes weak. Therefore, the predetermined temperature may be above 900° C., such as from about 900 to about 1350° C., such as about 1100 to 1350° C. The form is held in the heating chamber at said predetermined pressure and said predetermined temperature for a predetermined time period. The diffusion processes that take place between the powder particles during HIP are time dependent so long times are preferred. Preferable, the form should be HIP treated for a time period of about 0.5 to about 3 hours, such as about 1 to about 2 hours, such as about 1 hour.

A cermet or cemented carbide component obtained according to the process as defined hereinabove or hereinafter may be used in any product requiring good wear resistant properties and/or high stiffness.

For further illustrating the present disclosure, it is further described by the following non-limiting examples.

EXAMPLES

Example 1—Inhibitor Powder of Yttrium Oxide

Granules were formed from a slurry comprising powders of WC, Co, Cr, PEG and ethanol. The average grain size of the WC and the Co powder were 0.8 μm any 1.3 μm respectively. The slurry was spray dried in a Niro-spray drying equipment. The spray dried granules formed were sieved on a 63 μm net to leave only the smallest fraction from the granulated powder.

In this example, the final cemented carbide to be formed was a 10 wt % Co, 0.45 wt % Cr3C2 and 89.44 wt % WC material and the relative composition of the powders in the slurry were adapted therefor. The spray dried granules comprised about 2 wt % PEG.

The granules were mixed with yttrium oxide in a ratio of 50 wt % spherically shaped granule powder and 50 wt % yttrium oxide powder. The yttrium oxide powder had a particle size of about 3 μm in average.

The mixture of spherically shaped granules and yttrium oxide was distributed on yttrium oxide coated graphite trays. The trays were filled to a height of about 2 cm mixture.

Two different sintering temperatures were evaluated, 1370° C. and 1410° C. in vacuum environment. The liquid temperature of the metal (Co and Cr) in the granules is about 1307° C.

The sintering was performed in vacuum conditions of about 5 mbar. The heating cycle comprised an increase in temperature in hydrogen flow, where the temperature was held constant at 300° C. in 60 minutes to allow binder degassing. Thereafter the temperature was increased by 500° C. per minute. At the reached sintering temperature (maximum temperature) the temperature was hold constant for 90 minutes. Thereafter a cooling step was performed whereby the temperature was decreased down to room temperature.

After the sintering the sintered spherically shaped granules were separated from the yttrium oxide powder by two steps, first the sintered cake was gently dry milled for 10 minutes and then the spherically shaped granules were separated from the oxide powder in a magnetic separation step. In the magnetic separation step, the spherically shaped sintered granules were separated from the yttrium oxide utilizing the magnetism of the cemented carbide. The powder mixture was dispersed in ethanol. The cemented carbide powder could be kept at the bottom of the vessel by placing a Ferro magnet close to the bottom of the vessel, while the yttrium oxide could be decanted together with ethanol. 50 repetitions of the decanting were performed. After the decantation, the dense cemented carbide spherically shaped granules were dried in a furnace at a temperature of 50° C.

The granule size of the sintered dense spherically shaped granules of the cemented carbide powder sintered at 1410° C. was d(0.1): 22.4 μm, d(0.5): 32 μm and d(0.9): 46 μm. Several through cuts spherically shaped granules were studied showing a porosity of less than 0.02 vol % (<A02).

One way of measuring the density of the dense and spherically shaped granule powder is to study the density of tapped powder. For the present powder the full theoretical density is 14.45 g/cm3. The density of the tapped powder produced and 1370° C. and 1410° C. was 8.10 and 7.92 g/cm3, respectively. The slight difference in tapped density is most probably due to differences in particle (granule) size distribution.

Example 2—Inhibitor Powder of Graphite

Granules were formed from a slurry comprising powders of WC, Co, Cr, PEG and ethanol. The average grain size of the WC and the Co powder were 0.8 my any 1.3 my (Fischer) respectively. The slurry was spray dried in a Niro-spray drying equipment. The spherically shaped granules formed were sieved on a 63 μm net to use only the smallest fraction of the granulated powder.

In this example, the final cemented carbide to be formed was a 10 wt % Co, 0.45 wt % Cr3C2 and 89.44 wt % WC material and the relative composition of the powders in the slurry were adapted therefor. The spray dried spherically shaped granules comprised about 2 wt % PEG. The size of the granules was <63 μm.

The spherically shaped granules were mixed with graphite in a ratio of 75 wt % granule powder and 25 wt % graphite powder. The graphite powder had a particle size maximum size of about 45 μm. The shape of the graphite particles was typically flaky.

The mixture of spherically shaped granules and graphite was distributed on graphite trays. The trays were filled to a height of at least 2 cm and sometimes up to 5 or 10 cm.

Four different sintering temperatures were evaluated: 1270° C., 1290° C., 1310° C. and 1350° C., see Table 1. The solidus temperature of this cemented carbide is about 1300° C., but when saturated with carbon falls down to about 1250° C.

The heating cycle comprised heating during a constant flow of hydrogen up to 300° C., whereat the temperature was held constant for 60 minutes to allow binder degassing. Thereafter the temperature was increased by 500° C. per hour under vacuum pumping down to vacuum conditions. At the reached sintering temperature (maximum temperature), the temperature was hold constant for 90 minutes. Thereafter a cooling step was performed whereby the temperature was decreased down to room temperature.

After the sintering, the sintered spherically shaped granules are separated from the graphite powder by two steps, first in an air classification step and then in a decarburization step.

The air classification was performed in a laboratory air classification machine from Hosokawa Alpine (ATP50). By adjusting the parameters of the air classification machine to optimized performance a complete separation of loose graphite powder was obtained.

Subsequently, to remove the final excess of carbon from the mixture of sintered dense spherically shaped granules and inhibitor (graphite), a hydrogen gas decarburization treatment was performed. The mixture was distributed to 3 mm shallow beds in heat resistant vessels and charged into a muffle furnace and treated for 8 hours at 800° C.

The final dense and spherically shaped cemented carbide powder was studied in a scanning electron microscope and a cross section of some granules can be seen in FIG. 1. Several through cuts granules were studied showing a porosity of about 0 vol % for the granules that were heat treated with an inhibitor powder of graphite at a temperature of 1290° C. or above.

One way of measuring the density of the powder of dense and spherically shaped granules is to study the density of tapped powder. For the present powder the theoretical density is 14.45 g/cm$^3$. The density of the tapped powder of dense granules with a size distribution between 10-50 μm was 8.8 g/cm$^3$. A mixture between 1 part of foregoing powder with 4 parts of similar powder having a size distribution between 50-200 μm had a tapped density of 9.7 g/cm$^3$.

TABLE 1

| Sintering temperature (° C.) | Inhibitor powder | Porosity (vol %) |
|---|---|---|
| 1270 | Graphite | 5% |
| 1290 | No | 10% |
| 1290 | Graphite | 0% |
| 1310 | No | 5% |
| 1310 | Graphite | 0% |
| 1350 | No | 0% |
| 1350 | Graphite | 0% |

Example 3—HIP Process

The powder manufactured according the method described in Example 2 having a continuous particle size distribution within the range of about 10-200 µm was filled in a capsule made of zirconium grade 702 and which had the form as a simple bottomed tube in this case. The filling was performed under tapping action for maximized powder packing density (67 vol-% was reached).

A press-fitting lid was fitted on top of the tube and the tube was sealed by welding. The tube interior atmosphere was evacuated via a manifold and crimped and welded according to industrial practice for HIP.

The tube was put in a HIP-furnace and a maximum temperature was applied in slight excess of the solidus-temperature (e.g. 30° C. above the solidus temperature of the particular cemented carbide grade). A peak temperature of 1310° C. was used during 30 minutes. The HIP-pressure was 150 MPa during that period.

After the HIP process was performed the tube material was removed by pickling by using a mixture of 2% HF and 20% $HNO_3$.

The result was the following:
A fully dense material, with excellent wear properties was obtained. ASTM B611 wear test was performed:
Physical Properties

| Com (% Co) | 8.89 |
| He (k/Am) | 16.84 |
| Density (g/cm$^3$) | 14.35 |
| Porosity | A02B00C00 |
| WC grain size | ~1 µm |
| Hardness (Hv30) | 1470 |
| Mass loss (g)* | 0.2412 |

The microstructure was characterized by slightly deformed prior powder-particles from which Co-rich binder phase have been partially squeezed out to fill the remaining powder inter-particle interstices.

Figure 2:
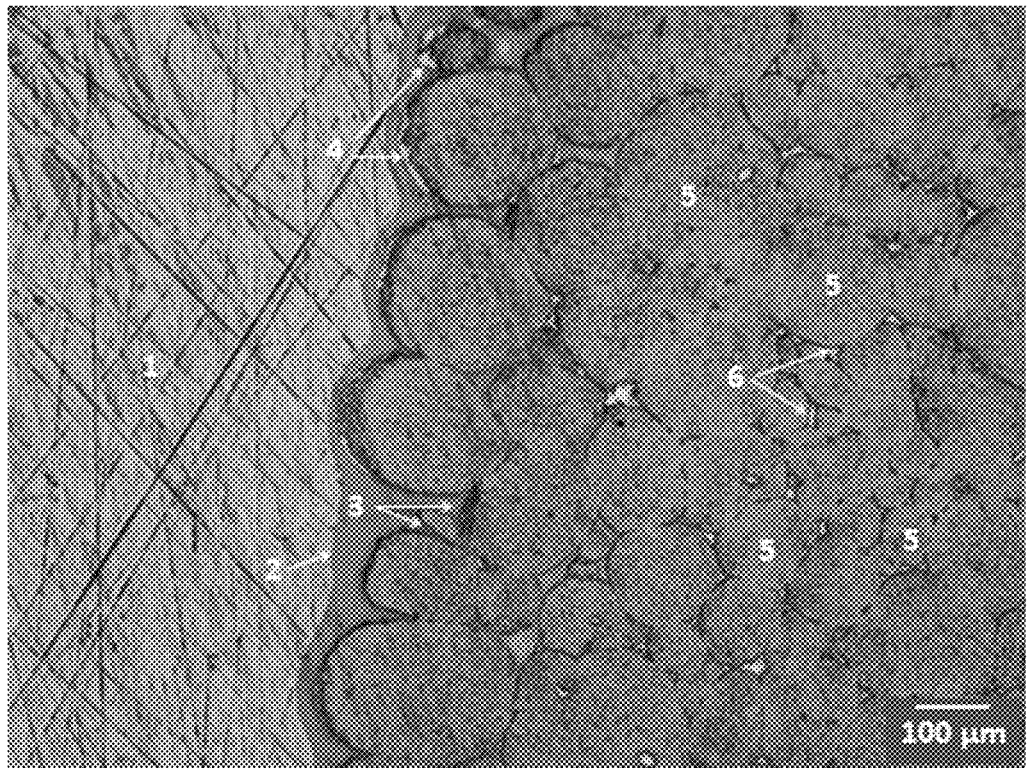
FIG. 2 shows an image of a cross-section of an interface between a Zr capsule and a cemented carbide component that has been obtained according to the process as defined hereinabove or hereinafter, wherein 1=Zr; 2=ZrC; 3=Prior Zr-rich Zr/Co-eutectic area; 4=sub-carbide phase; 5=Prior particles; 6=Squeezed out Co-binder phase.

FIG. 2 shows an image of a cross-section of an interface between the Zr capsule and the cemented carbide component, wherein 1=Zr; 2=ZrC; 3=Prior Zr-rich Zr/Co-eutectic area; 4=sub-carbide phase; 5=Prior particles; 6=Squeezed out Co-binder phase. As can be seen from FIG. 2, a bulk microstructure (i.e. within a distance of 100-200 µm from the capsule wall) characterized by absence of detrimental phase formations. Only a thin (about 100 µm) surface zone of the cemented carbide was found to be severely affected by sub-carbide formation and capsule metal (Zr-alloy) enrichment of the binder phase. The ZrC-layer in contact with the Zr-metal was only about 10 µm thick.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A method of making a powder of dense and spherically shaped cermet or cemented carbide granules, wherein the method comprises the steps of:
    (a) forming spherically shaped granules comprising metal, hard constituents and organic binder;
    (b) mixing said spherically shaped granules with a sintering inhibitor powder to form a mixture of spherically shaped granules and sintering inhibitor powder, wherein the sintering inhibitor powder includes graphite powder;
    (c) loading the mixture of spherically shaped granules and sintering inhibitor powder in a furnace chamber;
    (d) heat-treating the mixture of spherically shaped granules and sintering inhibitor powder obtained in step (b) in the furnace chamber at a sintering temperature to remove organic binder from the mixture of spherically shaped granules and sintering inhibitor powder and to sinter the hard constituents with the metal in each of the spherically shaped granules and thereby forming an intermediate product of a mixture of sintered dense spherically shaped granules and sintering inhibitor powder, each dense spherically shaped granule of the intermediate product of the mixture of sintered dense spherically shaped granules and sintering inhibitor powder having a porosity inside that is less than 5 vol %;
    (e) unloading the intermediate product of the mixture of sintered dense spherically shaped granules and sintering inhibitor powder from the furnace chamber; and
    (f) separating the sintering inhibitor powder from the intermediate product of the mixture of the sintered dense spherically shaped granules and sintering inhibitor powder, wherein the powder of dense and spherically shaped cermet or cemented carbide granules is formed, wherein the sintering inhibitor powder comprises carbon.

2. The method in accordance with claim 1, wherein the porosity inside each dense and spherically shaped cermet or cemented carbide granule is less than 1 vol %.

3. The method in accordance with claim 1, wherein the granule size of the sintered dense spherically shaped granules of the cermet or cemented carbide powder is 63 µm or less.

4. The method in accordance with claim 1, wherein the granule size of the sintered dense spherically shaped granules of the cermet or cemented carbide powder is up to 50 µm.

5. The method in accordance with claim 1, wherein the granule size of the sintered dense spherically shaped granules of the cermet or cemented carbide powder is up to 30 µm.

6. The method in accordance with claim 1, wherein the granule size of the sintered dense spherically shaped granules of the cermet or cemented carbide powder is such that the granule size fraction below 10 µm constitutes more than 10 wt % of the complete distribution.

7. The method in accordance with claim 1, wherein the granule size of the sintered dense spherically shaped granules of the cermet or cemented carbide powder is such that the granule size fraction below 10 µm constitutes more than 20 wt % of the complete distribution.

8. The method in accordance with claim 1, wherein the heat treatment in the furnace chamber is performed at a sintering temperature above a solidus temperature of the metal in the spherically shaped granules.

9. The method in accordance with claim 8, wherein the heat treatment in the furnace chamber is performed at a sintering temperature of from 30 to 100° C. above the solidus temperature of the metal in the spherically shaped granules.

10. The method in accordance with claim 8, wherein the heat treatment in the furnace chamber is performed at a sintering temperature of about 1310-1350° C.

11. The method in accordance with claim 1, wherein the heat treatment in the furnace chamber at the sintering temperature is performed in a vacuum.

12. The method in accordance with claim 11, wherein a pressure of the vacuum is about 5 mbar.

13. The method in accordance with claim 1, wherein the sintering inhibitor powder is separated from the sintered dense spherically shaped granules by sieving, air classification, hydrocyclone, flotation and/or fluidization.

14. The method in accordance with claim 1, wherein the sintering inhibitor powder is separated from the sintered dense spherically shaped granules by a thermochemical method using a gas at elevated temperature.

15. The method in accordance with claim 14, wherein the thermochemical method is performed in a rotating tube furnace or in a fluidized bed furnace.

16. The method in accordance with claim 1, wherein the step (f) of separating the sintering inhibitor powder from the sintered dense spherically shaped granules includes at least one of the following methods: sieving, air classification, hydrocyclone, flotation and/or fluidization, followed by a thermochemical step using a gas at elevated temperature.

17. The method in accordance with claim 16, wherein the thermochemical step is performed in hydrogen gas.

18. The method in accordance with claim 16, wherein the thermochemical step is performed at about 800° C.

* * * * *